(12) United States Patent
Banko

(10) Patent No.: US 7,213,176 B2
(45) Date of Patent: May 1, 2007

(54) ADAPTIVE LOG FILE SCANNING UTILITY

(75) Inventor: Stephen J. Banko, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 481 days.

(21) Appl. No.: 10/732,678

(22) Filed: Dec. 10, 2003

(65) Prior Publication Data
US 2005/0144526 A1  Jun. 30, 2005

(51) Int. Cl.
G06F 11/00 (2006.01)

(52) U.S. Cl. .................. 714/38; 714/57; 714/723

(58) Field of Classification Search .......... 714/38
See application file for complete search history.

(56) References Cited

U.S. PATENT DOCUMENTS

| | | | |
|---|---|---|---|
| 5,155,731 A | 10/1992 | Yamaguchi | 371/16.5 |
| 5,463,768 A | 10/1995 | Cuddihy et al. | 395/183.13 |
| 5,469,463 A | 11/1995 | Polich et al. | 395/182.18 |
| 5,835,765 A * | 11/1998 | Matsumoto | 718/102 |
| 6,345,322 B1 | 2/2002 | Humphrey | 710/38 |
| 6,493,656 B1 * | 12/2002 | Houston et al. | 702/187 |
| 6,539,341 B1 * | 3/2003 | Li et al. | 702/187 |
| 6,591,094 B1 | 7/2003 | Bentley | 455/405 |
| 6,598,179 B1 | 7/2003 | Chirashnya et al. | 714/37 |
| 6,647,517 B1 | 11/2003 | Dickey et al. | 714/48 |
| 6,650,949 B1 | 11/2003 | Fera et al. | 700/79 |
| 2002/0124215 A1 * | 9/2002 | Austen et al. | 714/57 |
| 2003/0110426 A1 | 6/2003 | Faust et al. | 714/723 |
| 2004/0153770 A1 * | 8/2004 | Lindsay et al. | 714/20 |
| 2004/0187048 A1 * | 9/2004 | Angamuthu et al. | 714/27 |

* cited by examiner

Primary Examiner—Scott Baderman
Assistant Examiner—Loan Truong
(74) Attorney, Agent, or Firm—Fish & Richardson P.C.

(57) ABSTRACT

A method is provided for monitoring error log files for specified error events through the use of a software program. In accordance with the method, each time the program is run, the steps are performed of: (a) accessing (405) an error log file, (b) identifying (419) those portions of the error log file not previously read by the program, (c) reading (413, 417) essentially only those portions of the error log file not previously read by the program and identifying (423) any predefined error conditions recorded therein, (d) generating a report (425, 429) which notes the existence of any predefined error conditions identified, and (e) terminating (427) the program.

20 Claims, 7 Drawing Sheets

ADAPTIVE LOG FILE SCANNING UTILITY

TECHNICAL FIELD OF THE INVENTION

The present disclosure pertains generally to computer software, and more particularly to computer software that monitors the log files created by other applications and notifies appropriate personnel of detected events.

BACKGROUND OF THE INVENTION

A variety of software applications create log files that keep a record of error conditions that have been detected. For example, an application that refers to an external file for configuration information may generate an error notice that is recorded in a log file associated with the application if that external file is determined to be missing or corrupt. Early identification of such error conditions allows remedial action to be taken that can minimize or eliminate the impact of these errors on a business being supported by the application. Hence, such log files are often monitored as part of a continuing production support environment.

As a practical matter, it is difficult and inefficient to have IT personnel continuously monitoring these log files, particularly in a large enterprise. Consequently, it is desirable to automate the monitoring process so that the appropriate personnel will be notified of any error conditions detected.

One complicating factor in this effort is that some applications create a series of log files in the form of a circular buffer. In such a configuration, the oldest file in the buffer is periodically deleted and is replaced with a file containing the newest information. The current or most recent log file will often have a standard name, and the previous log files will have derivative names based on the standard name. Such a configuration is often employed because it allows convenient access to the most recent data.

Unfortunately, the creation of the new standard log file by applications that utilize circular buffer log file configurations is not always predictable. In some instances, for example, the new standard log file is created only when a previous file has reached a certain size. Consequently, if attempts are made to access the log file for the purpose of implementing an automated monitoring process, these attempts may result in an older version of the log file being accessed, which in turn may result in lack of notification with respect to more recent error conditions. On the other hand, if the automated monitoring process is simply configured to look for the most recent log file, error events that have happened between successive iterations of the monitoring process may go undetected. As an added complication, if the monitoring process fails to adequately distinguish unreported error conditions from those that have already been reported, duplicate error notifications will be generated, thus resulting in the misapplication of IT resources.

Some conventional system management tools are configured to monitor log files by opening the file, reading and scanning the log file, sending out appropriate notifications, and then going into a sleep mode. After a certain period of time, the process wakes up to continue reading the log file. This type of approach utilizes the file system behavior to keep track of the file pointer position between sequential reads within a single program execution.

However, while such an approach is potentially capable of avoiding problems of the type noted above, this approach requires that the system management tool operate somewhat continuously in the background. Hence, programs of this type can consume a significant amount of system resources and bandwidth.

To date, some standard utilities, such as the GREP (Global Regular Expression Print) utility in UNIX, are capable of scanning files for occurrences of a specified string of characters. Every time it finds a line that contains the specified strings, it displays the line on screen. If it is searching through more than one file; it also notes the name of the file in which the string occurred. The user specifies which files to search through and which strings to look for.

The GREP utility, which may be run in the background, is utilized primarily to find one or more files which contain a known string when the name of the file containing the information is unknown. It can be utilized to check all the files in a directory or a single file. GREP has been utilized by software developers to search for known error conditions in build files.

In searching build files, GREP and other traditional search tools typically produce all potentially relevant hits, but leave it up to the user to determine which ones are real and what can be ignored. Such utilities could potentially be used to detect the presence of a certain character string (corresponding to a specific error message) in a log file for the purpose of monitoring these files. However, the use of such utilities becomes impractical when multiple character strings must be detected.

Other methods of conducting error log analysis have been developed and are disclosed in the literature. For example, one method has been disclosed for diagnosing faults in a computer-based system. In that method, a log of errors of different kinds that have been recorded in the system is read, and errors of those kinds that are relevant to one or more predetermined types of faults that can occur in the system are selected from the log. The selected errors are filtered so as to compose one or more events, each event comprising one or more occurrences of one or more of the relevant kinds of the errors. The composed events are analyzed to reach an assessment that at least one of the predetermined types of faults has occurred. In preferred embodiments of the method, an error log analyzer (ELA) scans error logs generated by a computer system. The logs are preferably generated whenever the system is running and are analyzed by the ELA at regular intervals and/or when a fault has occurred.

Another method of conducting error log analysis that has been disclosed in the literature relates to identifying predefined error conditions in a build output log file to determine if software build is defective. In accordance with the method, an output log file is generated within a storage device of a data processing system during a build of a software algorithm on the data processing system. A user creates a list file on the data processing system containing predefined valid error conditions. The output log file is searched to identify user-defined strings from the list file. A comparison of the user-defined strings identified during the search is made with predefined valid error conditions to determine when the user-defined strings identified matches the predefined valid conditions.

While the two methods described above may have some desirable attributes, they do not address the aforementioned problem concerning circular file buffers. These methods also do not describe a means by which the consumption of system resources by the error log monitoring process may be minimized.

There is thus a need in the art for methods for monitoring error log files of the type generated by software programs, which methods overcome the above noted infirmities. In particular, there is a need in the art for methods for monitoring error log files, and for software programs and systems which implement these methodologies, in which notice of all reportable error conditions in the error logs of software supporting a business is provided to the appropriate support personnel, and in which duplicative notices are avoided. There is further a need in the art for such methods, software and systems that can accommodate applications that utilize circular file buffers, and that can readily detect multiple character strings in error log files. There is also a need in the art for methods, software and systems of this type which minimize the use of system resources in the monitoring process. These and other needs are met by the methods, software and systems disclosed herein and hereinafter described.

SUMMARY OF THE INVENTION

The present disclosure provides methods for monitoring error log files, and software programs and systems which implement or utilize these methodologies, in which notice of all reportable error conditions in the error logs of software supporting a business is provided to the appropriate support personnel, and in which duplicative notices are avoided. These methods, and the software and systems that implement them, can accommodate applications that utilize circular file buffers, can readily detect multiple character strings in error log files, and can minimize the use of system resources in the monitoring process.

In one aspect, a software program, a method which is implemented by the program, and a system which utilizes the method or program, is disclosed herein. The software is disposed in a tangible medium and contains suitable instructions to enable the program, each time it is run, to perform the steps of (a) accessing the error logs associated with at least one software application, (b) reading essentially only those portions of the error logs not previously read by the program and identifying any predefined error conditions, (c) generating a report which notes the existence of any predefined error conditions identified by the program, and (d) terminating the program. The predefined error conditions are preferably character strings and may be defined in a file external to the program, and the program is preferably adapted to search for these strings in the log files associated with the at least one software application. Preferably, the program is adapted to read only those portions of the error logs not previously read by the program, and to report only those instances of the predefined error conditions not previously reported by the program. The program may be adapted, each time it is executed, to create a record of the portion of the error logs associated with the at least one software application that the program has read. The program may be further adapted, each time it is executed, to create a record of the position of the file pointer in the error logs associated with the at least one software application after the error logs have been read, and, in the subsequent execution, to read the error logs associated with the at least one software application starting from the last noted position of the file pointer. If the error logs associated with a software application comprise a plurality of files, the program may be adapted to read any partially read error file from the last noted position of the file pointer, and may be further adapted to read any unread error files.

The program may also be adapted to issue a first type of notification if none of the predefined error conditions have been identified, and may be further adapted to issue a second type of notification, distinct from the first type of notification, if at least one of the predefined error conditions has been identified.

The predefined error conditions may be set forth in first and second lists of character strings. In such embodiments, the program may be adapted to issue a first type of notification if an error condition is detected that is set forth in the first list, and may be further adapted to issue a second type of notification if an error condition is detected that is set forth in the second list.

The log files accessed by the program may be in the form of a circular buffer. The size of an error log file associated with a software application may be used to determine whether the program has previously read that error log file. Alternatively, the date and time on which an error log file was last modified may be used to determine whether the program has previously read that error log file.

In another aspect, a software program, and a method implemented by the software program, is provided. The program is disposed in a computer storage device or other tangible medium and contains suitable instructions to enable the program to operate on a log file associated with a software application by (a) utilizing a file pointer to identify the portion of the log file not previously read by the program, (b) reading the unread portion of the log file and identifying any predefined error conditions, (c) generating a report which notes any error conditions identified by the program, and (d) terminating the program. The program may be adapted to operate on log files associated with a plurality of software applications.

In some embodiments, the step of reading the unread portion of the log file may involve the step of moving the file pointer to a new location, and the program may be adapted to record the new location of the file pointer. In these embodiments, the program may be adapted to utilize the new location of the file pointer, the next time the program operates on the log file, to identify any portions of the log file that the program has not read.

In still another aspect, a software program, and a method implemented by the program, is provided herein. The program is disposed in a tangible medium and is adapted to monitor a log file associated with a software application for predefined error conditions. The program contains suitable instructions for (a) maintaining a tracking file which tracks the position of a file pointer that points to a log file associated with a software application, (b) retrieving, from the tracking file, the last recorded position of the file pointer, (c) reading the log file from the last recorded position of the file pointer such that, when the step of reading is completed, the file pointer points to the end of the last entry in the log file which was read, (d) updating, in the tracking file, the recorded position of the file pointer in the log file which has been read, (e) generating a report which notes the existence in the log file of any predefined error conditions, and (f) terminating the program. The program may be adapted to monitor the log files associated with a plurality of software applications for predefined error conditions, and the log files may be in the form of a circular buffer.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF PREFERRED EMBODIMENT

In accordance with the teachings herein, methods are provided for monitoring error log files of the type generated by software programs, and which overcome the above noted infirmities. In particular, methods for monitoring error log files, and software programs and systems which implement these methods, are provided herein in which notice of all reportable error conditions in the error logs of software supporting a business is provided to the appropriate support personnel, and in which duplicative notices are avoided. Methods, software and systems are also provided herein that can accommodate applications that utilize circular file buffers, that can readily detect multiple character strings in error log files, and that minimize the use of system resources in the monitoring process.

In accordance with a preferred embodiment of the methodology disclosed herein, a software program is provided that is adapted to scan specified error log files and to detect specific character strings, preferably defined in a file associated with the software, that indicate conditions that require further investigation. The program may be adapted such that, each time it is executed, it creates or writes to a file that tracks the last read record. Consequently, subsequent executions of this program will not re-read portions of error log files that have already been read, and thus will not report conditions that were previously detected and reported. This approach is more efficient, and consumes less system resources, than approaches in which the scanning program reads the log file and then goes into a sleep mode periodically while retaining the current file position through normal file system behavior.

The methodologies described herein, and the software and systems that implement or utilize these methodologies, are advantageous in that they can automate system monitoring while permitting rapid response to critical conditions. Consequently, the manpower required for system monitoring is reduced, thereby freeing IT resources for application to more complex tasks. The methodologies described herein, and the software and systems that implement or utilize these methodologies, allow a smaller IT staff to monitor a larger number of systems, thereby permitting the staff to operate with greater efficiency. In addition, the methodologies described herein, and the software and systems that implement or utilize these methodologies, reduce overall error by allowing critical issues to be programmatically identified that might be accidentally overlooked by a manual monitoring process.

The methodologies described herein, and the software and systems that implement these methodologies, are best understood by referring to FIGS. 1 through 7, like numerals being used for like and corresponding parts of the various drawings.

Figure 1:
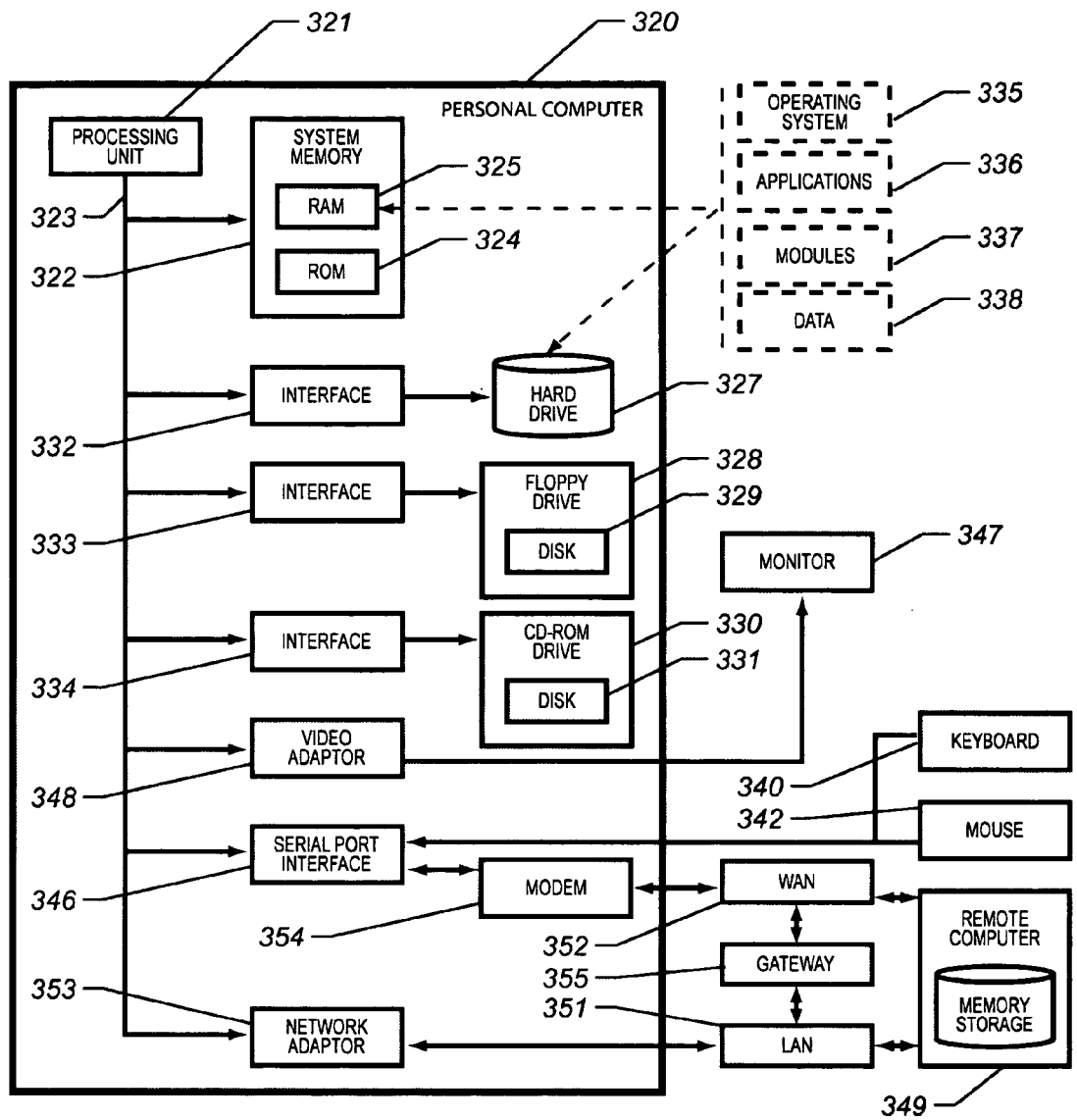
FIG. 1 illustrates a computing system that may be used in the implementation of the teachings disclosed herein.

FIG. 1 illustrates an exemplary system for using the methods, systems and devices disclosed herein. The system includes a general-purpose computer 320 which may be used as a stand-alone computer or as part of a larger, networked system of personal computers of the type used in a business enterprise. The computer 320 (which may be, for example, a personal computer, laptop, palmtop, set top, server, mainframe, or other type of computer) includes a processing unit 321, system memory 322, and system bus 323 that couple various system components, including system memory 322, to the processing unit 321. Processing unit 321 may be any of various commercially available processors, including Intel x86, Pentium® and compatible microprocessors from Intel® and others, including Cyrix®, AMD® and Nexgen®; MIPS® from MIPS Technology®, NEC®, Siemens®, and others; and the PowerPC® from IBM and Motorola. Dual microprocessors and other multi-processor architectures also can be used as the processing unit 321.

System bus 323 may be any of several types of bus structures including a memory bus or memory controller, a peripheral bus, and a local bus using any of a variety of conventional bus architectures such as PCI, VESA, AGP, Microchannel, ISA and EISA, to name a few. System memory 322 includes read only memory (ROM) 324 and random access memory (RAM) 325. A basic input/output system (BIOS), containing the basic routines helping to transfer information between elements within the computer 320, such as during start-up, is stored in ROM 324.

Computer 320 further includes a hard disk drive 327, a floppy drive 328, e.g., to read from or write to a removable disk 329, and CD-ROM drive 330, e.g., for reading a CD-ROM disk 331 or to read from or write to other optical media. The hard disk drive 327, floppy drive 328, and CD-ROM drive 330 are connected to the system bus 323 by a hard disk drive interface 332, a floppy drive interface 333, and an optical drive interface 334, respectively. The drives and their associated computer-readable media provide non-volatile storage of data, data structures, computer-executable instructions, etc. for computer 320. Although the description of computer-readable media provided above refers to a hard disk, a removable floppy and a CD, those skilled in the art will appreciate that other types of media which are readable by a computer, such as magnetic cassettes, flash memory cards, digital video disks, Bernoulli cartridges, and the like, may be used in the exemplary operating environment.

A number of program modules may be stored in the drives and RAM 325, including an operating system 335, one or more application programs 336, other program modules 337, and program data 338. A user may enter commands and information into the computer 320 through a keyboard 340 and pointing device, such as mouse 342. Other input devices (not shown) may include a microphone, joystick, game pad, satellite dish, scanner, or the like. These and other input devices are often connected to the processing unit 321 through a serial port interface 346 coupling to the system bus, but possibly connecting by other interfaces, such as a parallel port, game port or a universal serial bus (USB). A monitor 347 or other type of display device is also connected to the system bus 323 via an interface, such as a video adapter 348. In addition to the monitor, computers typically include other peripheral output devices (not shown), such as speakers and printers.

Computer 320 may operate in a networked environment using logical connections to one or more remote devices, such as a remote computer 349. Remote computer 349 may be a server, a router, a peer device or other common network node, and typically includes many or all of the elements described relative to the computer 320, although only a The logical connections depicted in FIG. 1 include a local area network (LAN) 351 and a wide area network (WAN) 352. Such networking environments are commonplace in offices, enterprise-wide computer networks, intranets and the Internet.

When used in a LAN networking environment, the computer 320 may be connected to the LAN 351 through a network interface or adapter 353. When used in a WAN networking environment, computer 320 typically includes a modem 354 or other means for establishing communications (e.g., via the LAN 351 and a gateway or proxy server) over the wide area network 352, such as the Internet. Modem 354, which may be internal or external, is connected to the system bus 323 via the serial port interface 346. In a networked environment, program modules depicted relative to the computer 320, or portions thereof, may be stored in a remote computer 349 or in a memory storage device associated therewith.

Those skilled in the art will appreciate that the network connections shown are exemplary, and that other means of establishing a communications link between the computers may be used. FIG. 1 provides merely one of many possible examples of a computer useful for the implementation or use of the methodologies, software and systems described herein. In particular, it is to be noted that the methodologies, software and systems described herein may be implemented by, or used in conjunction with, computers other than general-purpose computers, as well as general-purpose computers without conventional operating systems.

Figure 2:
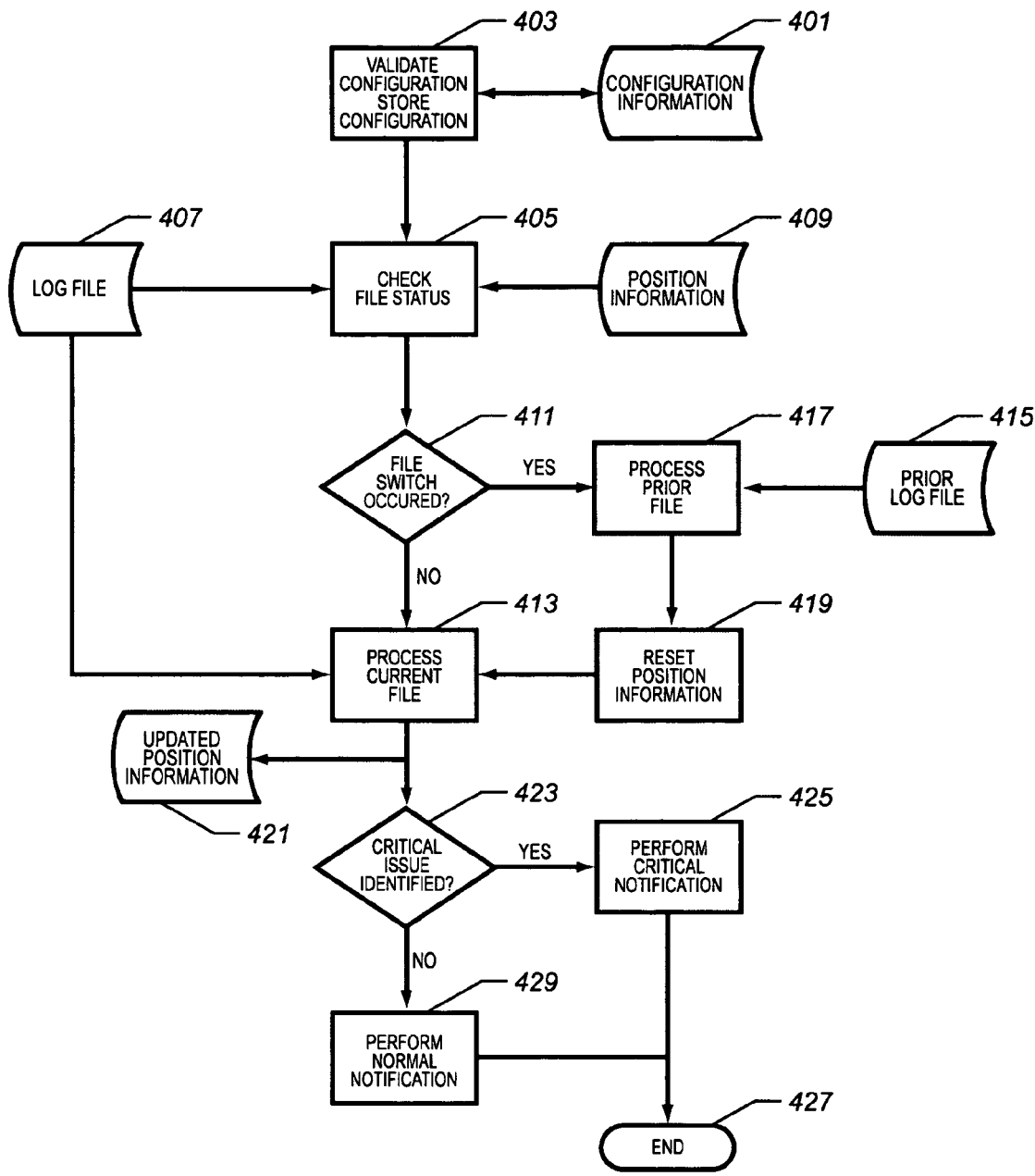
FIG. 2 is a flowchart illustrating one embodiment of the methodologies disclosed herein.

The process flow of one specific, non-limiting embodiment of the methodology described herein is illustrated in FIG. 2. As shown therein, configuration information relating to the error log analysis software is input 401. The configuration information may include such information as the particular programs, systems, or error logs associated therewith that are to be monitored by the software, the error conditions to be reported, the category that the particular types of error conditions are to be placed in, the IT personnel to be notified in the event of a particular type of error and the contact information of those personnel, the various permutations of characters associated with a particular type of error notice that are to be used in scanning the error logs, and the general format (including such variables as font size, font type, and background color) that error reports are to be issued in.

The configuration information may be input into the program manually, or may be read from and maintained in a configuration file associated with the program. The configuration file will preferably have various default settings which may be modified or updated by the user or system administrator.

As noted above, the configuration file will typically include the error conditions to be reported, and the category the particular types of error conditions are to be placed in. This information may be placed in an error descriptor file. The error descriptor file describes which error strings to search for and, when a specified string is found, what conditions to ignore. One non-limiting example of a possible format for the error descriptor file is as follows:

| /* ErrorDescriptor.lis */ | | | | |
|---|---|---|---|---|
| ErrorString: *'fatal'* | | | Case Sensitive: no | |
| /* | | | | */ |
| /* Valid Strings: | Range | | | */ |
| /* | From | To | Case | */ |
| /* | (–) | (*) | Sen? | */ |
| /* | | | | */ |
| *'0 Severe Errors'* | 0 | 0 | Y | |

In the particular embodiment of the error descriptor file depicted above, the first line is a comment which identifies the file and which commences with the characters '/*'. The second line is a search descriptor that is defined by the string variable ErrorString. In the particular example depicted, the software is configured to detect lines in error log files which contain the string "fatal". In this example, a wildcard character '*' has been used to ensure that lines containing the string "fatal" will be detected regardless of what precedes or follows the string "fatal" in the line. The Case Sensitive field, which in the example illustrated has been given the Boolean value "Yes", determines whether the search is to proceed on a case sensitive basis. The last line shown is the first of what will typically be several valid descriptors. The valid descriptors determine which search hits are to be considered as corresponding to valid conditions and hence ignored or omitted in the review of the error log files.

The error descriptor file preferably has the following general format:

SearchDescriptor 1
   Valid Descriptor $a_1 1$
   .
   .
   .
   Valid Descriptor $a_1 n_1$;
.
.
.
Search Descriptor k
   Valid Descriptor $a_k 1$
   .
   .
   .
   Valid Descriptor $a_k n_k$;

Hence, the file contains a series of k search descriptors. The $i^{th}$ search descriptor is followed by $n_i$ associated valid descriptors. These search descriptors define the particular strings to search for in the error log. The ErrorString command is followed by the particular string to search for, which may be input by the user in response to a prompt or which may be read from a file.

The valid descriptors are optional definitions which may follow a search descriptor. As noted above, the valid descriptors indicate which instances of the string are to be ignored when there is a particular search descriptor hit. Preferably, the file is arranged such that the listed valid descriptors correspond to the preceding search descriptor. The number of valid descriptors following a search descriptor is not particularly limited, and may be modified over time.

The valid descriptors have a variety of formats. One possible format includes the following fields:

String Literal and Wildcard: These fields specify text to search for in a Search Descriptor hit that would indicate that the string detected corresponds to a valid condition and should therefore be ignored;

Range: This field causes the software to examine the lines above and below the search hit for the specified text. Hence, this field provides a means by which a user may specify that, if a given condition is found within a range of the hit, it should be ignored;

Upper Case Sensitive: If this field has the Boolean value "Y", the valid descriptor text must exactly match the font case of the search hit for the hit to be considered valid (and therefore ignored);

This File Only: This field can be used to indicate that a specified valid descriptor only applies to a particular log file. Hence, this field is utilized when a user wants to overlook a particular error in one file (or file directory), but not in all cases.

Preferably, ErrorDescriptor is invoked with the following parameters: "ErrorDescriptor [logs or files to search] <error descriptor file></d>." The default error descriptor file is errordescriptor.lis. It is also preferred that ErrorDescriptor provides an output of the true errors to the user or designated personnel (complete with the line numbers and error strings via output to monitors, files, or other devices). ErrorDescriptor may be configured to return a value of 0 or 1, with a '0' signifying that no error strings were found or that all strings found were resolved with reference to the appropriate valid descriptor strings, and a '1' signifying errors found that have no matching valid descriptor string. ErrorDescriptor may be configured to produce an output which contains a list of scanned files having unresolved errors. For each file, a list of unresolved errors may be produced. Preferably, the output is only produced when unresolved errors are found.

Referring again to FIG. 2, after the configuration information is input, the program validates 403 the configuration information and stores it in a configuration information file. The step of validating the configuration information may involve, for example, such steps as ascertaining that the configuration file is of a valid file type, ascertaining that the values of all variables defined in the file are within an acceptable range, ascertaining the validity of the syntax of the information, and checking the user and/or ID of the person inputting the configuration or specifying a file from which configuration settings may be read.

The step of storing the configuration information in a configuration file may include, for example, writing the configuration information to a volatile or non-volatile memory device such as a floppy disk, an optical disk, a disk drive, RAM, ROM, or the like. This step may involve creating a new configuration file, or updating an existing file.

After the configuration information is input and stored, the program then checks 405 the log file status, a process which involves accessing 407 the log file, reading 409 the log file pointer position information from the prior execution, and determining 411 whether or not a file switch has occurred (that is, whether or not the processing can continue from the present file pointer position). In some embodiments, there may be more than one log file being accessed. There may also be more than one pointer associated with a particular log file. The step of determining whether or not a log file has been renamed or switched may include the steps of comparing the size, name, content, or other characteristics of a file to the values of these characteristics when the file was last accessed by the program.

If no log file switch has occurred, the current log file is accessed 407 and processed 413 from the current pointer position. If, on the other hand, the prior log file was renamed or "switched", the program recognizes that the log file name now points to a new file created as part of a circular buffer strategy. In such a case, the program will first read the prior log file 415 from the stored pointer position to process 417 the remainder of unscanned log information that is located there. The program will then reset 419 the ending file pointer,position information and process the current log file 413 (and any intervening log files) from the beginning.

After the most recent log file is processed, the file pointer position information is updated 421, and any reportable issues noted in the log files that have not previously been reported are identified 423. In the embodiment depicted in FIG. 1, the reportable issues are divided into two categories, namely, those requiring normal notification and those requiring critical notification. If any critical issues are noted, a critical notification is sent 425 to the appropriate personnel maintaining the system, after which the program terminates 427. If no critical issues are identified, normal notification is performed 429, and the program terminates 427.

Of course, it will be appreciated that the reportable issues identified by the program may be placed into any number of different categories, and that a wide variety of notifications may be sent by the program to various persons responsible for the maintenance of the system. For example, in some instances, multiple critical notifications may be issued by the program. These notifications may relate to different parts or aspects of the system, and may therefore be addressed to different parties. In other instances, both critical and non-critical issues may be detected in a single iteration of the program, and the program may be adapted to issue both critical and + non-critical notifications to the appropriate personnel. In still other instances, an issue may be detected that is critical to one part of the system, but not to others. In such a situation, the program may be adapted to issue a critical notification to the appropriate personnel responsible for the affected part of the system, and non-critical (e.g., informational) notifications to personnel responsible for other parts of the system.

Figure 3:
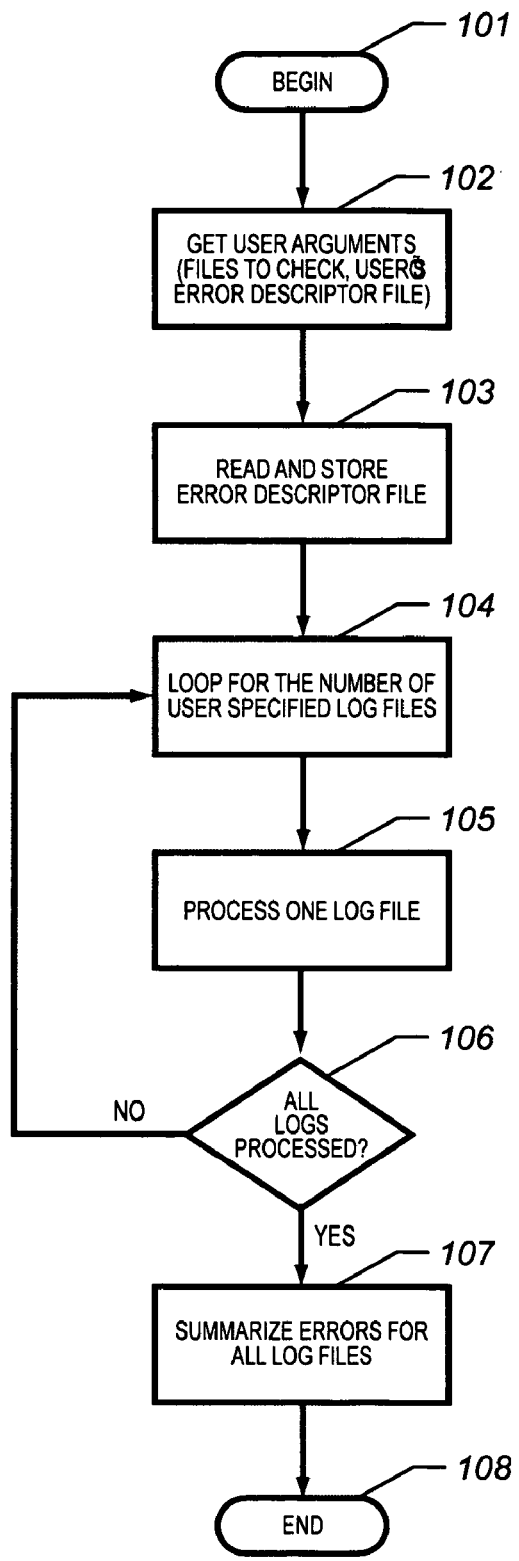
FIG. 3 is a flowchart illustrating one embodiment of the logic flow that may be utilized in the processing of a series log files in practicing the methodologies disclosed herein.

FIG. 3 illustrates one possible logic flow that may be followed in using the methodologies disclosed herein to process a series log files. At the beginning 101 of the process, the user either directly or indirectly enters suitable arguments. The arguments may be manually entered when the program is run, but are preferably input from a configuration file. These arguments, which include, for example, a list of error log files to check and the appropriate descriptor file or files, are received by the process 102. The process then reads and stores the error descriptor file 103. A loop is established with a count equal to the number of error log files 104 to be analyzed. The process then operates on one error log file at a time 105 and loops until each of the files has been processed. Once all of the log files have been processed 106, the errors detected in the log files 107 are summarized. The process then terminates 108.

Figure 4:
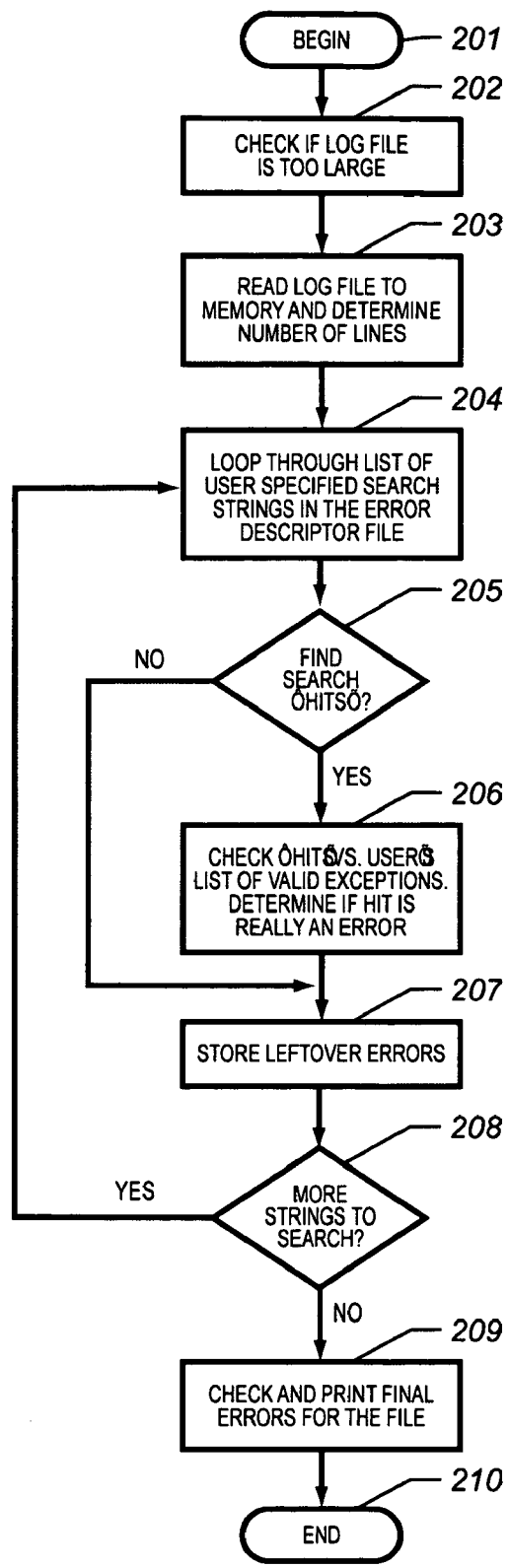
FIG. 4 is a flowchart illustrating one possible logic flow that may be utilized for the actual processing of the log file in the practice of the methodologies disclosed herein.

FIG. 4 illustrates one possible logic flow that may be utilized for the actual processing of an error log file in the practice of the methodologies disclosed herein. The process begins with the entry of an error log file as an argument 201. As noted previously, this information may be entered directly by the user, or may be read from one or more specified files or locations. An initial check is made to ascertain that the error log file is not too large 202. The error log file is then read to memory, and the number of lines in the error log file is determined 203. A loop is then established with a count equal to the number of search strings specified in the error descriptor file 204. Each user specified search string is selected and compared to the strings in the log file. If any matches or hits are found 205, each hit is compared against the list of valid descriptors 206 to determine whether the hit is a true error. Left over errors from the process are stored 207.

Following this comparison of the user specified search string, the process checks the loop count to determine if there are any more user specified search strings 208. If there are, the process loops back and begins a check of the next user specified search string in the list. If there are no more search strings in the list, then the process checks and prints final errors for the file 209. The process then terminates 210.

Figure 5:
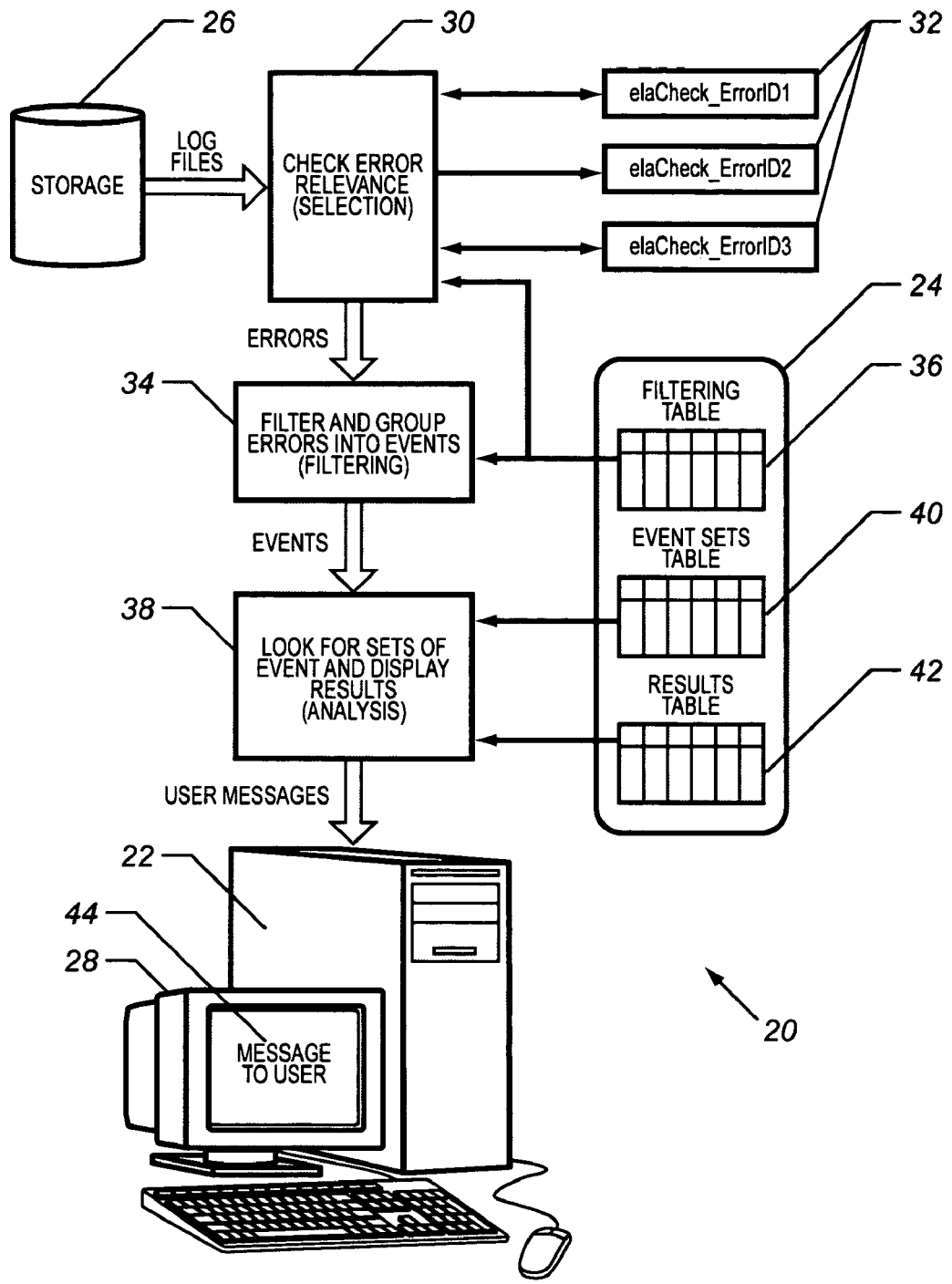
FIG. 5 is a block diagram that schematically illustrates one possible embodiment of an Error Log Analyzer (ELA) that may be utilized in the practice of the methodologies disclosed herein.

FIG. 5 is a block diagram that schematically illustrates one possible embodiment of an Error Log Analyzer (ELA) 20 that may be utilized in the practice of the methodologies disclosed herein. The ELA may be implemented, for example, as a software process on a node of a computer system. In the embodiment depicted, the node is linked to a storage device 26, such as a hard disk, and has a memory 24 and a processor 22 with a display 28. The software needed to perform the functions of the ELA may be provided to processor 22 in electronic form, either over a network or on tangible media such as CD-ROM. The ELA may likewise be implemented as a software process in a stand-alone computer, or in substantially any computerized system. Alternatively, the ELA may be implemented using a dedicated computer or other dedicated hardware, to which an error log of a system to be diagnosed is input.

ELA 20 analyzes system log files and determines the best course of action for a user (such as a system administrator or field support engineer) to take in order to resolve problems in the system. The ELA first determines whether there is a problem to be fixed. If so, it informs the user of the most probable actions that should be taken in order to rectify the situation. Preferably, the ELA is invoked periodically, for example, once every 24 hours, as scheduled by an operating system of the computer system. Additionally or alternatively, the ELA may be invoked by the operating system when certain types of errors, such as a permanent hardware error, appear in the error log. Further additionally or alternatively, the ELA may be invoked by the user when the user becomes aware of a possible fault.

Whenever ELA 20 is invoked, it retrieves and scans error logs stored in storage device 26. It processes data from the error logs in three distinct stages: a selection stage 30, a filtering stage 34 and an analysis stage 38. These processing stages may make use of tables that are preferably loaded into memory 24, including a filtering table 36, an event table 40 and a results table 42, which are described in detail below.

Selection stage 30 involves the extraction of error log data from system error logs. During this stage, each error is preferably checked for relevance by examining the detailed data in the log with respect to filtering table 36. If the error is found to be of interest, based on a list of errors in the filtering table and criteria defined by callback functions 32, it is kept for further processing. One of the criteria that may be considered at this stage, for example, is whether the error was generated by a local failure or a remote one, i.e., an error that happened on a remote node or switch. To a system administrator who is responsible for local system maintenance, remote errors are often not generally of interest. Callback functions 32, such as Perl scripts external to the main ELA program, may be used to check each error type (referred to as ErrorID1, ErrorID2, etc.) for relevance. By using these external scripts, the error selection criteria can be easily modified and added to, without recompilation of the ELA. Based on the selection results, stage 30 outputs an error list to filtering stage 34.

Filtering stage 34 involves the grouping of certain errors together, while filtering other errors out of the process, using filtering table 36. The grouped and filtered errors are composed into events, which are output in an event list.

The grouping of errors at this stage is advantageous in that, under some conditions, errors have a tendency to appear in groups. Therefore, it is important to monitor not only the number of errors that occur, but the groups of closely-related errors that occur in a common time frame. For example, a transient event, such as someone stepping on a cable, might generate several immediate errors that do not signify an ongoing problem. Therefore, if certain types of errors appear in the error log grouped closely together, it is often convenient to treat them as a single event. After grouping errors together, the ELA measures the number of recurring groups (or in some cases the number of recurring errors). The ELA may be configured to determine that a fault exists only if a problem persists for more than a specified period of time.

The filtering stage can also involve the decision to remove certain errors or groups of errors from the data compiled. This feature may be useful when certain system events are known to have occurred. For example, if a message is received stating that a given node in a computer system has been disconnected from its switch network, it may be desirable to remove errors logged at around the time of the message, since these errors were likely associated with the disconnection and were not triggered by a true hardware malfunction.

The analysis stage 38 involves taking the filtered data in the event list from filtering stage 34 and deciding whether a fault has occurred, as well as giving any supplemental information to the user. In this stage, the ELA may be configured to check the number of events generated of a certain specified type or types. If the number is beyond a preset threshold, a problem is reported. Additional conditions may be attached to the events. For example, a transient error in a switch adapter might be considered acceptable from time to time due to network overload, but if this event appears more than a certain number of times over a particular time interval, then a fault is reported.

Analysis stage 38 involves diagnosing device problems using event sets, which may be stored in event sets table 40. An event set is a list containing event identifiers and the minimum number of events needed for an associated fault condition to be found true. For each event set, a time frame is also specified. If all of the events in the set appear in the error log within the specified time frame, in larger numbers than specified minimum values, the fault condition associated with the event set is found to be true. For example, one such condition might be the appearance of two error types (A and B) in the same time frame in certain numbers (e.g., at least ten occurrences of error A and at least one occurrence of error B within 15 minutes). In this case, even more than 10 events of type A, without a single event of type B, would not lead the ELA to report a problem.

If the condition indicated by a particular event set is found to be true, the ELA reads the corresponding result from results table 42. The result is shown, preferably on display 28, as a message 44 to the computer user or IT personnel. It may occur that multiple conditions are true, indicating multiple possible faults, or that a single event set is indicative of a number of possible different faults. In such cases, all of the possible fault results are preferably displayed. In addition, if the fault can be cured by replacement of a field-replaceable unit (FRU), then the message to the user preferably also includes an identification of the FRU.

Tables 36, 40 and 42 may be filled in and refined by product development and technical support personnel. For example, if a field engineer is aware that a given device is operating under strenuous conditions which cause the device to generate more frequent occurrences of a certain event than might occur in normal operation, the engineer might edit the tables to increase the threshold value for that event. Increasing the threshold will eliminate possible inaccurate reports that the device is malfunctioning. On the other hand, if the field engineer notices certain errors that slip by the ELA, he or she can decrease the threshold value for that corresponding event. However, most parameters used for filtering and analysis have defaults that are used when no other value has been specified.

Figure 6:
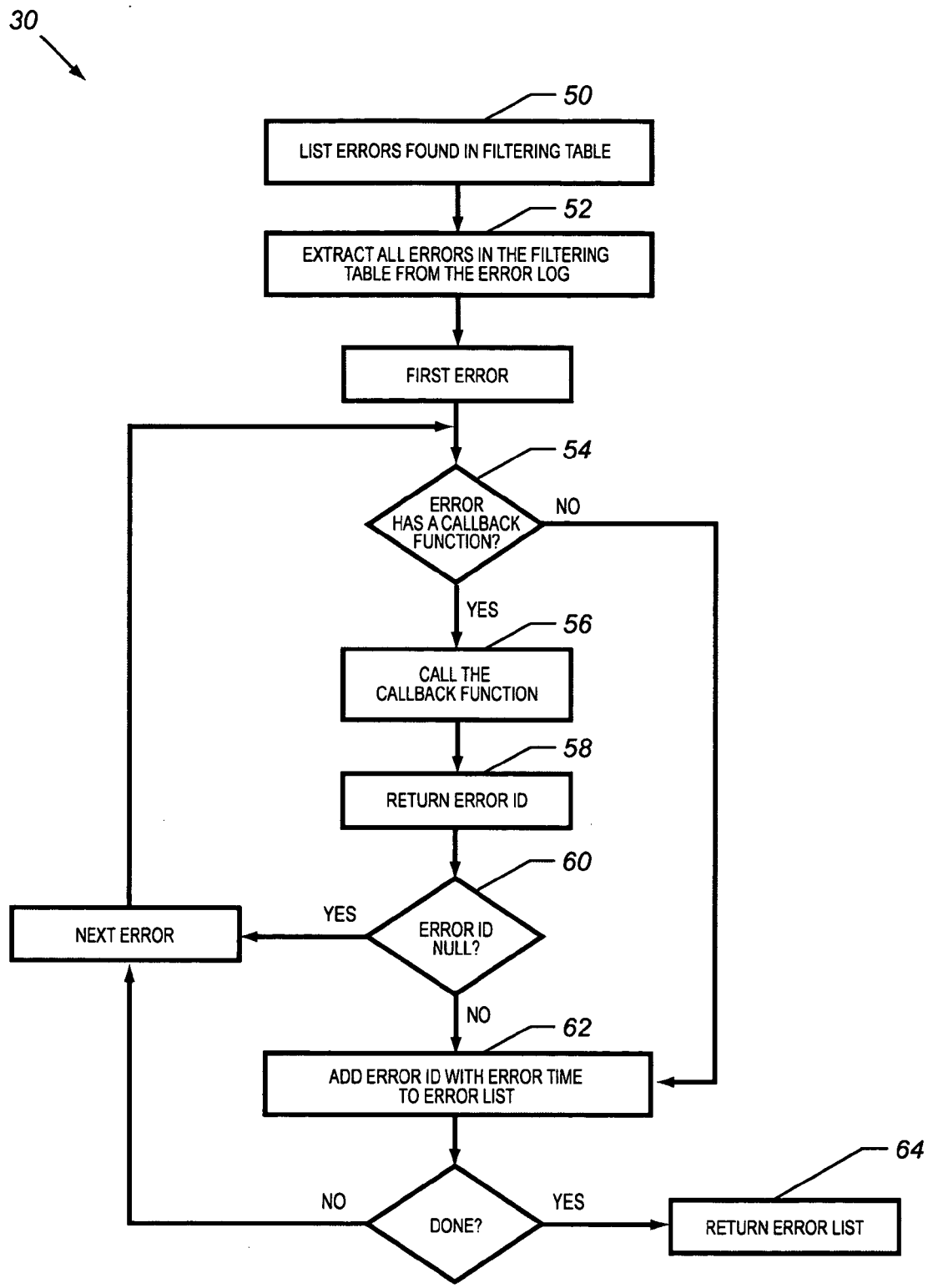
FIG. 6 is a flow chart that schematically illustrates details of one possible embodiment of the selection stage of the ELA of FIG. 5.

FIG. 6 is a flow chart that schematically illustrates the details of one possible embodiment of the selection stage 30. At an error list step 50, the ELA parses filtering table 36 in order to generate a list of errors that may be relevant to the current error log analysis. Errors that do not appear in the predicate of any of the conditions in the filtering table are irrelevant for this purpose, and are therefore preferably discarded. At an extraction step 52, the ELA goes over the errors in the error log that occurred over some specified period of time (e.g., the last 24 hours). The errors that appear in the filtering table are then extracted for subsequent processing.

Callback functions 32 (see FIG. 5) may be used to examine detailed data carried by the corresponding error entries in the log to determine whether the error is relevant and needs to be examined further. Thus, at a check callback step 54, the ELA determines for each error received from step 52 whether there is a corresponding callback function 32. If not, the error is passed on without further processing at this stage. At a callback step 56, the appropriate callback function is called. At a return step 58, the callback returns an identifier, or ErrorID, for the particular error. If the error is not relevant the callback returns NULL, and the error is discarded at a null error step 60. Otherwise, at an add step 62, the ErrorID, together with the time of occurrence of the error, is added to the error list. When the selection stage is done, the error list is output to filtering stage 34, at a return list step 64.

The callback can also be configured to return a new ErrorID specifying a special condition that has been newly detected. This feature can be used, for example, to subtype error log entries into new errors, giving a more accurate fault description and finer distinctions between different error types. The new ErrorID should be properly addressed in filtering table 36 and in event sets table 40. After the errors are processed using this mechanism, the ELA continues to filter the data using the filtering table.

Figure 7:
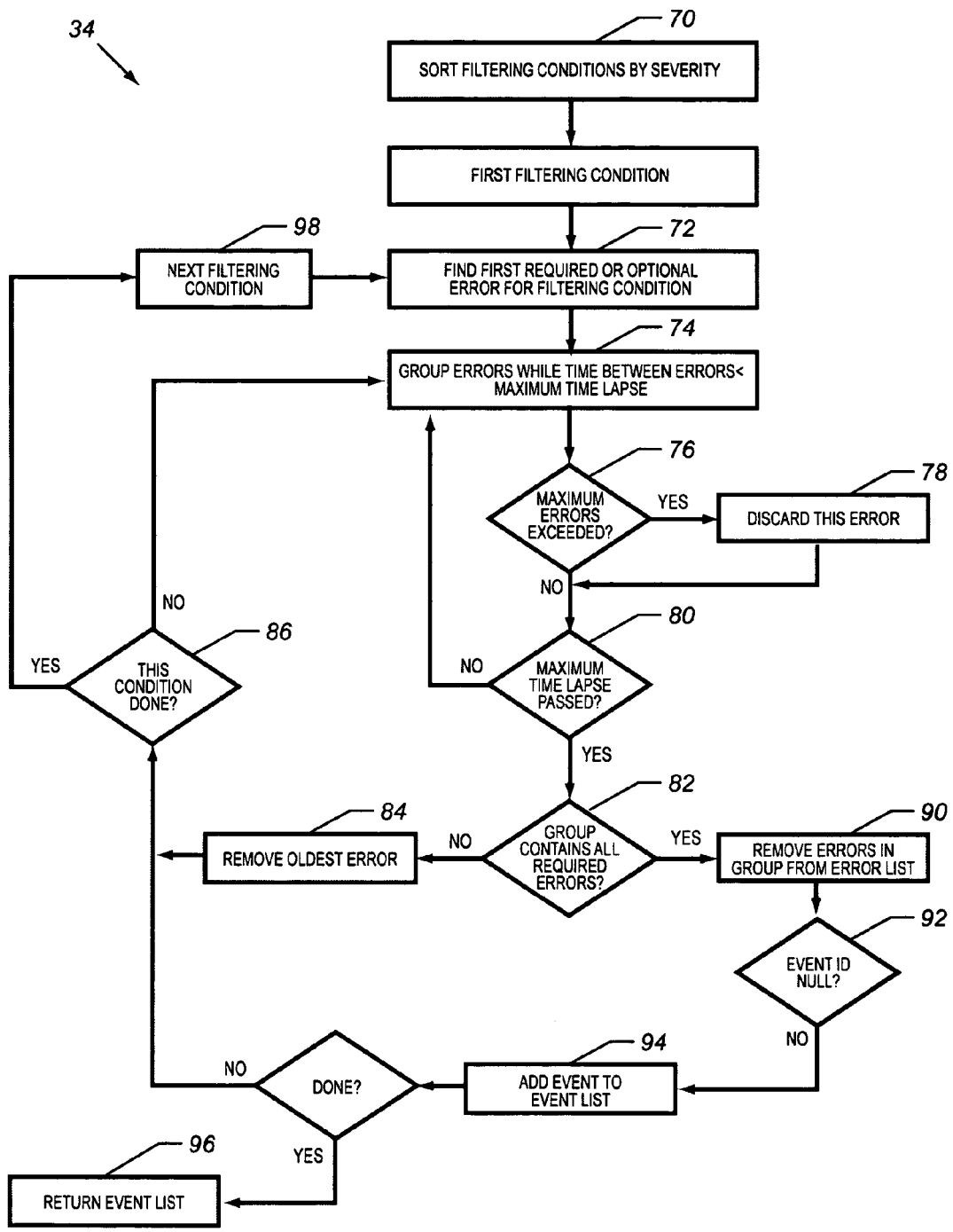
FIG. 7 is a flowchart illustrating the details of one possible embodiment of the filtering stage of the ELA of FIG. 5.

FIG. 7 is a flow chart illustrating the details of one possible embodiment of the filtering stage 34. At a sorting step 70, the entries in filtering table 36 are sorted by severity. The sorted filtering conditions are then processed in turn, in order of their severity and of their appearance in the table. For each of the conditions, the ELA scans the error list received from selection stage 30 to find the first instance of one of the required or optional error IDs associated with the condition, at an error finding step 72. The ELA then continues to scan the error list for other required or optional errors associated with the condition under consideration. The errors found in this manner are grouped together into the single event specified by the condition, at an error grouping step 74. If the event can contain only a single error, step 74 and subsequent steps are skipped, and the process continues at an error removal step 90. Grouping of the errors in step 74 continues as long as no more than the specified Maximum Time Lapse has passed in the error log between the error instance and the current one.

Whenever a new error is added to the event, the ELA checks to determine whether the cumulative number of errors has exceeded the Maximum Errors criterion for this filtering condition 76. Any errors in excess of the maximum are returned to the error list, at an error discard step 78. At a time lapse step 80, the ELA determines whether the specified Maximum Time Lapse has passed between the time of the current error and the previous one. If the maximum time has lapsed, the ELA then checks, at a check all errors step 82, whether the group contains all of the Required Errors specified for this condition in the filtering table. Optional errors are not taken into account at this step.

If it is determined at step 82 that not all of the required errors have been accumulated in the group, the oldest error in the group is removed from the group, at an error removal step 84. The ELA then checks, at a condition done step 86, whether there are any later errors on the error list relevant to the current filtering condition. If so, the filtering process for this filtering condition continues back at step 74. If the relevant errors have been exhausted, however, the next filtering condition (in the order established at step 70) is selected at a next condition step 98. Processing of this next condition begins, as it did for the preceding condition, at step 72.

On the other hand, if at step 82 the group is found to be complete, then all of the errors in the group, including both the required and the optional errors, are removed from the error list, at an error removal step 90. If the corresponding Event ID for this entry is null, then the event is discarded, at a null event check step 92. Otherwise, at an add event step 94, the event is added to the event list for output to analysis stage 38. As long as there are further errors in the error list and conditions in the filtering table to be checked, stage 34 loops back through step 86, as described above. When filtering stage 34 is completed, the procedure of FIG. 7 terminates and passes the event list to analysis stage 38, at a return event list step 96.

The methodologies, systems and software described herein have a number of technical advantages. For example, one of the benefits of some of the methodologies described herein is that software programs which implement these methodologies can be configured to run on command, and can be further configured to terminate after the log file has been updated and all appropriate notifications have been sent out. By contrast, conventional system management tools that are adapted to monitor log files operate by opening the file, reading and scanning it, and then going into a sleep mode. After a certain period of time, the process wakes up to continue reading the file. This type of approach utilizes the file system behavior to keep track of position between sequential reads within a single program execution. By contrast, in the preferred embodiment of the approach described herein, the program actually terminates rather than merely going into a sleep mode, thereby freeing up system resources. The program then restarts on command, using the stored file position information from the previous iteration.

In processing a log file, a software program made in accordance with the teachings herein will preferably compare character strings found in the log file to a list of character strings defining reportable events, and will note any matches. These character strings may be of varying lengths, and may comprise a variety of (preferably alphanumeric) characters.

The list of character strings defining reportable events may be written into the program itself, but is preferably maintained in an external file that is accessed by the program. The program may be equipped with a subroutine or other functionality that allows the contents of the list to be defined, modified or updated by the user.

In some embodiments, the program may use multiple lists of character strings for scanning the log file. These lists may be maintained in the same or separate files, or may be written directly into the program itself. For example, the program may utilize a first list which will trigger an informational notification, such as email, for conditions that are of interest but are not critical, and a second list which will trigger a more urgent notification, such as paging messages, for conditions that require immediate attention.

The program may provide a variety of suitable outputs that convey useful information to appropriate personnel in an appropriate format. For example, in addition to noting any errors that were detected, the program may also be adapted to suggest appropriate courses of action for responding to some or all of those errors. These responses may be defined external to the program by specifying the action in external files whose names are passed to the program at runtime.

The program may also be adapted to provide statistical information relating to detected events. This information may pertain only to those events detected in the most recent iteration of the program, or it may be cumulative over a given period of time that may optionally be specified by the user. This information, which may be arranged or displayed in tables, charts, graphs, or other suitable formats, may be designed to allow system administrators to identify reoccurring problems or trends in the event logs. The program may also be adapted to output this information to external files, or to other programs, where it can be used for various purposes, including, but not limited to, system analysis and optimization.

Various modifications can be made to the specific methodologies described herein to achieve similar results. For example, as noted previously, the use of a date/time stamp to determine that a log file roll event occurred could be used in lieu of retaining the file position information. Alternatively, the program could be adapted to build a record of identified events. This record could then be used to filter events so as to prevent the issuance of duplicate notifications.

The programs described herein may also be implemented in a variety of formats. Preferably, the program is a stand-alone program that may be run on an operating system. This operating system may be the operating system used to run or manage an enterprise, a server, a node, a portion of the backbone of the Internet or an intranet, or the like. The program may be adapted to run from a tangible medium, such as a floppy disk, an optical disk, or a disk drive. The program may also be adapted to be installed on an operating system, and may be accessible to a system administrator through various icons, buttons, menus, keyboard commands, and the like. In some embodiments, the program or its associated files or outputs may only be used, modified or accessed by someone with administrative privileges or by someone having a required user ID and/or password.

Various situations and error conditions may be monitored by the methods, software programs and systems disclosed herein. These include the following general error types:

(1) Advisory errors—errors that do not interrupt normal operations and are recorded for informational purposes only.
(2) Correctable errors—errors that can be corrected by hardware or software.
(3) Uncorrectable errors—errors that may require some software help to contain the error or its effects and to keep the system running.
(4) Fatal errors—errors that can cause data corruption if the data processing system or subsystem is not halted immediately.
(5) Component failures—catastrophic failures of a system component, such as disk memory.
(6) Deadlock failures—failures that occur when two or more processes are competing for the same resource and these processes cannot proceed to completion because the resource is unavailable.

Specific examples of errors that may be reported or noted by the software include, without limitation, server errors, such as the errors commonly generated when a server becomes congested or is unavailable; system messages and alerts, such as those generated as a result of a hardware malfunction, data corruption, resource allocation issues, low memory space, unauthorized access, or attack; security violations; and volume errors.

The methods, systems and software described herein may be used to monitor a wide variety of log files associated with various software programs, systems and devices. Some non-limiting examples of these logs include transaction logs of the type kept by mail servers and by login daemons, backup logs of the type maintained by backup software, and error logs of the type kept by software applications and user programs.

Methods for monitoring error log files, and software programs and systems which implement these methods, have been provided herein in which notice of all reportable error conditions in the error logs of software supporting a business is provided to the appropriate support personnel, and in which duplicative notices are avoided. Methods, software and systems have also been provided herein that can accommodate applications that utilize circular file buffers, that can readily detect multiple character strings in error log files, and that minimize the use of system resources in the monitoring process.

Although the methods, systems and software disclosed herein has been described in detail, one skilled in the art will appreciate that various changes, substitutions and alterations can be made hereto without departing from the spirit and scope of the disclosure.

What is Claimed is:

1. A method for monitoring error log files with a software program, comprising the steps, each time the software program is run, of:
accessing an error log file;
identifying portions of the error log file not previously read by the program;
reading essentially only the portions of the error log file not previously read by the program;
determining if the portions of the error log file not previously read by the program include one or more predefined error conditions;
generating a report which notes the existence of any predefined error conditions; and
terminating the program;
wherein the program is adapted to issue a first type of notification if none of the predefined error conditions have been identified in the error log file; and wherein the program is adapted to issue a second type of notification, distinct from the first type of notification, if at least one of the predefined error conditions have been identified in the error log file.

2. The method of claim 1, wherein at least one of the predefined error conditions comprises strings of characters, and wherein the program is adapted to search for these strings in the error log file.

3. The method of claim 1, wherein the program is adapted, each time it is executed, to create a record of the portion of the error log file that the program has read, and wherein the program is farther adapted to use this record to identify the unread portion of the error log file.

4. The method of claim 1, wherein the program is adapted, each time it is executed, to create a record of the position of the file pointer in the error log file after the error log file has been read, and wherein the program is further adapted, in the subsequent execution, to read the error log file staffing from the last recorded position of the file pointer.

5. The method of claim 4, wherein the program is adapted to monitor a plurality of error log files associated with an application, and wherein the program is farther adapted to read any of the plurality of error log files that have been partially read in a previous program iteration from the last recorded position of the file pointer associated with that error log file.

6. The method of claim 5, wherein the program is farther adapted to read any of the plurality of error log files that have not previously been read.

7. The method of claim 1, wherein the program is adapted to monitor a plurality of error log files associated with an application, and wherein the error log files are arranged in the form of a circular buffer.

8. The method of claim 1, wherein the size of the error log file is used to determine whether the program has previously read that error log file.

9. The method of claim 1, wherein the date and time on which the error log file was last modified is used to determine whether the program has previously read that error log file.

10. The method of claim 1, wherein the step of reading essentially only those portions of the error log file not previously read by the program comprises the steps of:
maintaining a tracking file which tracks the position of a file pointer that points to the last read line in an error log file;
retrieving, from the tracking file, the last recorded position of the file pointer;
reading the error log file from the last recorded position of the file pointer such that, when the step of reading is completed, the file pointer points to the end of the last entry in the error log file which was read; and
updating, in the tracking file, the recorded position of the file pointer in the error log file which has been read.

11. A method for monitoring error log files with a software program, comprising the steps, each time the software program is run, of:
accessing an error log file;
identifying portions of the error log file not previously read by the program;
reading essentially only the portions of the error log file not previously read by the program;
determining if the portions of the error log file not previously read by the program include one or more predefined error conditions, wherein the predefined error conditions comprise first and second lists of character strings;
generating a report which notes the existence of any predefined error conditions; and
terminating the program;
wherein the program is adapted to issue a first type of notification if an error condition is detected that is set forth in the first list,
and wherein the program is adapted to issue a second type of notification if an error condition is detected that is set forth in the second list.

12. The method of claim 11, wherein the program is adapted, each time it is executed, to create a record of the portion of the error log file that the program has read, and wherein the program is further adapted to use this record to identify the unread portion of the error log file.

13. The method of claim 11, wherein the program is adapted, each time it is executed, to create a record of the position of the file pointer in the error log file after the error log file has been read, and wherein the program is further adapted, in the subsequent execution, to read the error log file starting from the last recorded position of the file pointer.

14. The method of claim 11, wherein the date and time on which the error log file was last modified is used to determine whether the program has previously read that error log file.

15. The method of claim 11, wherein the step of reading essentially only those portions of the error log file not previously read by the program comprises the steps of:
maintaining a tracking file which tracks the position of a file pointer that points to the last read line in an error log file;
retrieving, from the tracking file, the last recorded position of the file pointer;
reading the error log file from the last recorded position of the file pointer such that, when the step of reading is completed, the file pointer points to the end of the last entry in the error log file which was read; and
updating, in the tracking file, the recorded position of the file pointer in the error log file which has been read.

16. A method for monitoring error log files with a software program, comprising the steps, each time the software program is run, of:
accessing an error log file;
identifying portions of the error log file not previously read by the program, wherein the size of the error log file is used to determine whether the program has previously read that error log file;
reading essentially only the portions of the error log file not previously read by the program;
determining if the portions of the error log file not previously read by the program include one or more predefined error conditions;
generating a report which notes the existence of any predefined error conditions; and
terminating the program.

17. The method of claim 16, wherein the program is adapted, each time it is executed, to create a record of the portion of the error log file that the program has read, and wherein the program is further adapted to use this record to identify the unread portion of the error log file.

18. The method of claim 16, wherein the program is adapted, each time it is executed, to create a record of the position of the file pointer in the error log file after the error log file has been read, and wherein the program is further adapted, in the subsequent execution, to read the error log file starting from the last recorded position of the file pointer.

19. The method of claim 18, wherein the program is adapted to monitor a plurality of error log files associated with an application, and wherein the program is further adapted to read any of the plurality of error log files that have been partially read in a previous program iteration from the last recorded position of the file pointer associated with that error log file.

20. The method of claim 16, wherein the step of reading essentially only those portions of the error log file not previously read by the program comprises the steps of:

maintaining a tracking file which tracks the position of a file pointer that points to the last read line in an error log file;

retrieving, from the tracking file, the last recorded position of the file pointer;

reading the error log file from the last recorded position of the file pointer such that, when the step of reading is completed, the file pointer points to the end of the last entry in the error log file which was read; and updating, in the tracking file, the recorded position of the file pointer in the error log file which has been read.

\* \* \* \* \*